(12) United States Patent
Shibata

(10) Patent No.: US 7,498,093 B2
(45) Date of Patent: *Mar. 3, 2009

(54) PERPENDICULAR MAGNETIC RECORDING MEDIUM AND METHOD FOR MANUFACTURING THE SAME

(75) Inventor: Kazuyoshi Shibata, Tokyo (JP)

(73) Assignee: Fuji Electric Device Technology Co., Ltd. (JP)

( * ) Notice: Subject to any disclaimer, the term of this patent is extended or adjusted under 35 U.S.C. 154(b) by 409 days.

This patent is subject to a terminal disclaimer.

(21) Appl. No.: 11/063,232

(22) Filed: Feb. 22, 2005

(65) Prior Publication Data

US 2005/0196641 A1    Sep. 8, 2005

(30) Foreign Application Priority Data

Feb. 24, 2004    (JP)    ............................... 2004-048463

(51) Int. Cl.
*G11B 5/66*    (2006.01)

(52) U.S. Cl. .................................................... 428/832.1

(58) Field of Classification Search ........................ None
See application file for complete search history.

(56) References Cited

U.S. PATENT DOCUMENTS

| | | | |
|---|---|---|---|
| 5,750,270 A | 5/1998 | Tang et al. | |
| 5,834,085 A | 11/1998 | Lairson et al. | |
| 6,596,418 B2 * | 7/2003 | Maesaka et al. | 428/819.1 |
| 6,627,301 B2 | 9/2003 | Shimizu et al. | |
| 6,630,255 B1 | 10/2003 | Litvinov et al. | |
| 6,656,613 B2 * | 12/2003 | Litvinov et al. | 428/827 |
| 6,743,503 B1 | 6/2004 | Chen | |
| 6,869,688 B2 | 3/2005 | Usuki | |
| 6,953,629 B2 | 10/2005 | Hintz et al. | |
| 7,033,686 B2 * | 4/2006 | Hirayama et al. | 428/832 |
| 7,056,605 B2 * | 6/2006 | Kawada | 428/832.1 |

(Continued)

FOREIGN PATENT DOCUMENTS

JP    2001-155329 A    6/2001

(Continued)

OTHER PUBLICATIONS

Relevant portion of Search Report and Written Opinion issued in Application No. SG200304569-7 dated Apr. 29, 2005 from Australian Patent Office corresponding to related U.S. Patent 7,056,605 B2 issued Jun. 6, 2006.

(Continued)

*Primary Examiner*—Holly Rickman
(74) *Attorney, Agent, or Firm*—Rossi, Kimms & McDowell LLP

(57) ABSTRACT

There is provided a perpendicular magnetic recording medium which causes low media noise and achieves preferable read/write performance. A perpendicular magnetic layer is constructed such that first magnetic layers formed of Co or Co containing an oxide and second magnetic layers formed of Pt or Pd containing an oxide are layered. The perpendicular magnetic layer is provided on a non-magnetic substrate via a Ru underlayer containing oxygen. An alignment control layer formed of a Ni—Fe alloy is provided between the non-magnetic substrate and the underlayer to control the crystal alignment of the underlayer. A soft magnetic backing layer is provided between the substrate and the alignment control layer.

8 Claims, 2 Drawing Sheets

U.S. PATENT DOCUMENTS

| | | |
|---|---|---|
| 2002/0037439 A1 | 3/2002 | Litvinov et al. |
| 2002/0076579 A1 | 6/2002 | Hanawa et al. |
| 2005/0052793 A1 | 3/2005 | Hong et al. |
| 2005/0142378 A1 | 6/2005 | Nemoto et al. |
| 2005/0153169 A1 | 7/2005 | Watanabe et al. |
| 2005/0249984 A1 | 11/2005 | Ohmori et al. |
| 2006/0134467 A1 | 6/2006 | Hirayama et al. |

FOREIGN PATENT DOCUMENTS

| | | |
|---|---|---|
| JP | 2001-291230 A | 10/2001 |
| JP | 2002-25032 A | 1/2002 |
| JP | 2002-197634 A | 7/2002 |
| JP | 2002-203306 A | 7/2002 |
| JP | 2002-334415 A | 11/2002 |
| JP | 2003272122 A | 9/2003 |
| JP | 2003-281708 A | 10/2003 |
| JP | 2003-317223 A | 11/2003 |
| JP | 2005-190517 A | 7/2005 |
| JP | 2005-209303 A | 8/2005 |
| JP | 4079051 B2 | 2/2008 |
| WO | 03/071300 A1 | 8/2003 |

OTHER PUBLICATIONS

Singapore Search Report and Written Opinion issued in corresponding Singapore Patent application No. SG200500634-1, mailed Feb. 21, 2007. The Search Report and Written Opinion were prepared by the Australian Patent Office; corresponding to related U.S. Appl. No. 11/069,920 (Publication No. US-2005/0202285 A1).

Notification of Reasons for Refusal issued in corresponding Japanese patent application No.: 2004-048463, dated Oct. 21, 2008. Partial translation provided.

* cited by examiner

Oxygen Concentration of Underlayer (Atom %)

Oxygen Concentration of Underlayer (Atom %)

PERPENDICULAR MAGNETIC RECORDING MEDIUM AND METHOD FOR MANUFACTURING THE SAME

CROSS REFERENCE TO RELATED APPLICATIONS

This application is based on, and claims priority to, Japanese Application No. 2004-0484663, filed Feb. 24, 2004, the contents of which are incorporated by reference herein.

BACKGROUND OF THE INVENTION

A. Field of the Invention

The invention relates generally to a perpendicular magnetic recording medium for use in a fixed magnetic recording device and a method for manufacturing the same, and more particularly to a perpendicular magnetic recording medium which can achieve an excellent read/write performance at a low medium noise, and a method for manufacturing the same.

B. Description of the Related Art

In recent years, personal computers, workstations, and similar devices have been equipped with a mass-storage and a small-sized magnetic recording apparatus, and a magnetic disk as a magnetic recording medium has been required to have increased recording density.

At present, an in-plane (longitudinal) magnetic recording method in which an easy axis is parallel to the surface of a magnetic recording medium is usually used, and as the surface recording density increases, the thermal stability of recording bits becomes a problem. To further increase the recording density, the use of perpendicular magnetic recording is being investigated. In a perpendicular magnetic recording medium, an easy axis of a magnetic film is aligned perpendicularly to the surface of a substrate. For this reason, magnetizations that are adjacent to each other do not face each other in a magnetization transition area. Even if the bit length is decreased, magnetization is stable, and magnetic fluxes are not decreased as is the case with an in-plane magnetic recording medium. Therefore, the perpendicular magnetic recording medium is suitable as a high density magnetic recording medium.

As stated above, a perpendicular magnetic recording medium is more advantageous as a high recording density magnetic recording medium than an in-plane magnetic recording medium, but causes high media noise. Ordinarily, as the media noise decreases, read/write performance is improved to achieve high-density recording, and hence a layer structure for a perpendicular magnetic recording medium has been devised to reduce media noise.

As an example of the above known perpendicular magnetic recording medium, as disclosed in Japanese Laid-Open Patent Publication (Kokai) No. 2002-1203306,a "double-layer perpendicular magnetic recording medium" is known in which a soft magnetic backing layer is formed on a non-magnetic substrate such as aluminum or glass, an underlayer for perpendicularly aligning a magnetic layer is formed on the soft magnetic backing layer, and a perpendicular magnetic recording layer and a protective layer are formed on the underlayer. As this perpendicular magnetic recording layer, many multilayer film structures have been envisaged, such as a perpendicular magnetic film formed of a Co group alloy such as Co—Cr, Co—Cr—Ta, or Co—Cr—Pt, a multi-layered perpendicular magnetic film such as CO/Pt or Co/Pd in which a predetermined number of Co layers and Pt layers (or Pd layers) are alternately layered, and an amorphous perpendicular magnetic film such as Tb—Co or Tb—Fe—Co.

In particular, as a prospective high recording density medium, a great deal of research has been done with multi-layered perpendicular magnetic films such as Co/Pt or Co/Pd, since these have high perpendicular magnetic anisotropy (Ku), thermal stability, and coercivity, and can easily achieve a squareness ratio of approximately 1.0. However, a multi-layered perpendicular magnetic film such as Co/Pt causes high media noise, and various attempts have been made to reduce this media noise. For example, in Japanese Laid-Open Patent Publication (Kokai) 2002-25032,a method has been proposed in which B (boron) chips are placed on the surface of a target, and Argon (Ar) and oxygen ($O_2$) are sputtered in a mixed gas to segregate boron (B) and an oxygen atom (O) at the grain boundary of a magnetic layer. According to this method, if the amount of boron (B) to be added is between 0 atom % and about 1.0 atom %, the signal-to-noise ratio (SNR) is improved, but if the amount of boron (B) added is greater, the SNR is saturated. Also, in the case where an oxygen atom (O) is added, if the amount of oxygen (O) to be added is between 0 atom % and about 0.1 atom %, the signal-to-noise ratio (SNR) is improved, but if the amount of oxygen atoms (O) to be added is greater, the SNR is saturated.

Also, in Japanese Laid-Open Patent Publication (Kokai) No. 2001-155329, a method has been proposed in which an underlayer or a segmented layer in which an oxide such as $SiO_2$ is added to metal having a face-centered cubic structure such as Pt, Au, Pd, Ag, Rh, Ir, or Cu. According to this method, in Co layers and Pt layers (or Pd layers) constituting a magnetic layer, grains such as Co and Pt (or Pd) are not very far apart from each other, and hence there is a high magnetic interaction between crystal grains forming the magnetic layer, which causes media noise.

As described above, in a perpendicular magnetic recording medium having the conventional multi-layered film structure, media noise cannot be sufficiently reduced. In order to increase the surface recording density, media noise needs to be further reduced.

The present invention is directed to overcoming or at least reducing the effects of one or more of the problems set forth above.

SUMMARY OF THE INVENTION

It is therefore an object of the present invention to provide a perpendicular magnetic recording medium which can reduce media noise and achieve a high recording density, and achieves preferable read/write performance, and a method of manufacturing the same.

To attain the above object, there is provided a perpendicular magnetic recording medium, which includes a perpendicular magnetic layer constructed such that at least first magnetic layers and second magnetic layers are alternately layered, the perpendicular magnetic layer being formed on a non-magnetic substrate via an underlayer; and in which the first magnetic layer consists of Co or Co containing an oxide, and the second magnetic layer consists of Pt, Pd, Pt containing an oxide, or Pd containing an oxide; and the underlayer consists of Ru containing oxygen.

Preferably, the amount of oxygen contained in the underlayer is between 2 atom % and 20 atom %.

Preferably, the oxide contained in the first magnetic layer is an oxide of at least one element among Si, Al, Ga, In, Ge, Sn, Sb, Bi, Zn, Cd, Cr, Mo, W, V, Nb, Ta, Ti, Zr, Hf, Y, Mg, and Ba, and the content of oxide is between 5 mol % and 20 mol %.

Preferably, the oxide contained in the second magnetic layer is an oxide of at least one element among Si, Al, Ga, In, Ge, Sn, Sb, Bi, Zn, Cd, Cr, Mo, W, V, Nb, Ta, Ti, Zr, Hf, Y, Mg, and Ba, and the content of oxide is between 5 mol % and 20 mol %.

A soft magnetic backing layer and an alignment control layer formed of a Ni—Fe alloy may be further provided in this order between the non-magnetic substrate and the underlayer.

There is also provided a method of manufacturing a perpendicular magnetic recording medium comprising a perpendicular magnetic layer constructed such that at least first magnetic layers and second magnetic layers are alternately layered, the perpendicular magnetic layer being formed on a non-magnetic substrate via an underlayer, comprising a step of forming the underlayer by sputtering using a mixed target of Ru and $RuO_2$ and sputtering gas to which no oxygen is added.

The above and other objects, features, and advantages of the invention will become more apparent from the following detailed description taken in conjunction with the accompanying drawings.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
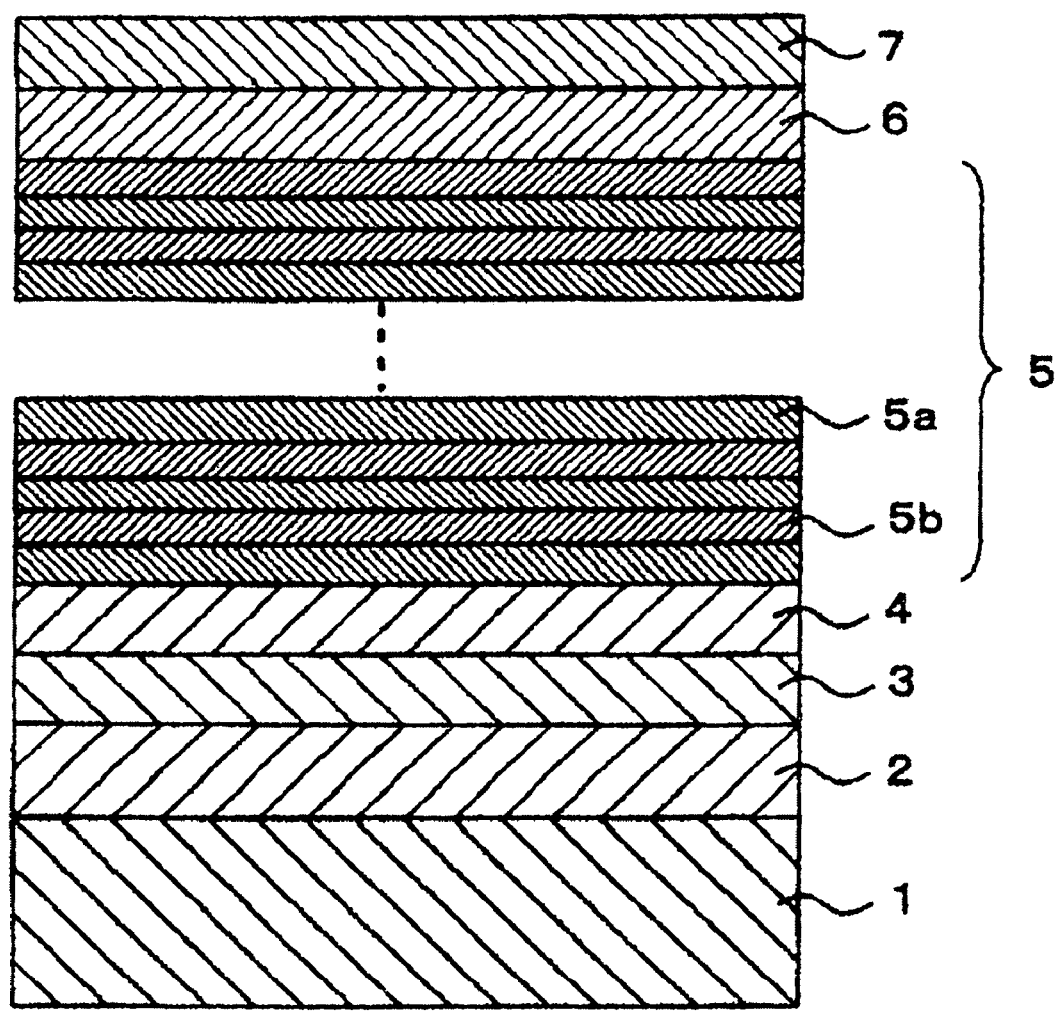
FIG. 1 is a view explaining an example of the structure of a perpendicular magnetic recording medium according to the present invention.

The present invention will now be described in detail with reference to the drawings showing a preferred embodiment thereof. FIG. 1 is a view useful in explaining an example of the structure of a perpendicular magnetic recording medium according to the present invention. The perpendicular magnetic recording medium is constructed such that soft magnetic backing layer 2, alignment control layer 3, Ru underlayer 4 containing oxygen, perpendicular magnetic layer 5, and protective layer 6 are sequentially layered on non-magnetic substrate 1, and lubricant layer 7 is formed on protective layer 6. Perpendicular magnetic layer 5 is constructed such that a number of first magnetic layers 5a and second magnetic layers 5b are alternately layered.

In the perpendicular magnetic recording medium according to the present invention, NiP-plated aluminum (Al) alloy or reinforced glass, or crystallized glass can be used as non-magnetic substrate 1. Soft magnetic backing layer 2 is a layer which is preferably formed so as to improve read/write performance by controlling a magnetic flux from a magnetic head used for magnetic recording, but may be omitted. As the soft magnetic backing layer, a polycrystalline NiFe alloy, sendust (FeSiAl) alloy, a Co—Fe alloy, a Fe—Ta—C alloy, a Co—Fe—Ni alloy, or a Co—Ni—P alloy may be used, but preferable electromagnetic conversion characteristics can be obtained by using an amorphous Co alloy such as a Co—Zr—Nb or a Co—Ta—Zr alloy. It should be noted that the optimum value of the film thickness of soft magnetic backing layer 2 varies according to the structure and characteristics of a magnetic head used for magnetic recording, but is preferably between 10 nm and 500 nm in view of productivity in the case where soft magnetic backing layer 2 and another layer are formed continuously. The soft magnetic backing layer may be as thick as several µm in the case where it is formed in advance on a non-magnetic substrate by e.g., plating before another layer is formed.

Alignment control layer 3 is preferably formed just under underlayer 4 so as to improve the alignment of underlayer 4, but may be omitted. Alignment control layer 3 may be made of either a non-magnetic material or a soft magnetic material. In the case where soft magnetic backing layer 2 is formed under alignment control layer 3, it is preferred that a soft magnetic material which can serve as a part of soft magnetic backing layer 2 is used.

Examples of alignment control layer 3 having soft magnetic characteristics are an Ni group alloy such as an Ni—Fe, an Ni—Fe—Nb, an Ni—Fe—B, or an Ni—Fe—Cr alloy, Co, or a Co group alloy such as a Co—B alloy, a Co—Si alloy, a Co—Ni alloy, or a Co—Fe alloy. In particular, a Ni—Fe alloy is preferably used so as to control the alignment of Ru underlayer 4 containing oxygen. Also, it is possible to layer the above-mentioned materials to form a plurality of layers so as to secure the crystal lattice matching and control the crystal grain diameter.

Underlayer 4 is intended to facilitate the separation of crystal grains of perpendicular magnetic layer 5 and reduce the magnetic exchange interaction of the crystal grains, and a Ru film containing oxygen is preferably used as underlayer 4. Underlayer 4 is formed of oxygen and hexagonal close packed structure (hcp) Ru to form perpendicular magnetic layer 5 comprised of a multi-layered film in a preferable manner so that the signal-to-noise ratio (SNR) in reading and writing can be improved.

It is preferred that underlayer 4 is formed by a sputtering method from a mixed target composed of Ru and $RuO_2$. It is preferred that a rare gas such as Ar gas is used as sputtering gas, and oxygen is not added. Since underlayer 4 is formed using a mixed target of Ru and $RuO_2$, and oxygen is not added to the sputtering gas, the amount of oxygen to be added to underlayer 4 can be easily controlled to a desired value.

It is preferred that the film thickness of underlayer 4 is between 3 nm and 50 nm. If the film thickness of underlayer 4 is less than 3 nm, the crystals of underlayer 4 itself cannot be sufficiently grown, and if the film thickness of underlayer 4 is greater than 50 nm, the interval between soft magnetic backing layer 2 and perpendicular magnetic layer 5 is increased, and soft magnetic backing layer 2 cannot satisfactorily control a magnetic flux from a magnetic head.

Perpendicular magnetic layer 5 is comprised of a large number of first magnetic layers 5a and second magnetic layers 5b which are alternately layered. It is preferred that first magnetic layer 5a is made of Co, or Co to which is added the oxide of at least one element among Si, Al, Ga, In, Ge, Sn, Sb, Bi, Zn, Cd, Cr, Mo, W, V, Nb, Ta, Ti, Zr, Hf, Y, Mg, and Ba. It is preferred that second magnetic layer 5b is made of Pt or Pd, or Pt or Pd to which is added the oxide of at least one element among Si, Al, Ga, In, Ge, Sn, Sb, Bi, Zn, Cd, Cr, Mo, W, V, Nb, Ta, Ti, Zr, Hf, Y, Mg, and Ba.

First magnetic layers 5a and second magnetic layers 5b made of the above-mentioned materials are alternately layered so that a strong crystal magnetic anisotropy (Ku) can be obtained using an interface magnetic anisotropy, and the thermal stability can be improved. If an oxide is added to each of first magnetic layers 5a, an oxide such as non-magnetic $SiO_2$ is segregated between Co grains, and the miniaturization and isolation of Co grains can be facilitated. If an oxide is added to each of second magnetic layers 5b, an oxide such as non-magnetic $SiO_2$ is segregated between Pt or Pd grains to facilitate the miniaturization and isolation of Pt or Pd grains. As a result, the coercive force (Hc) can be greater than in the case where no oxide is added to any of magnetic layers 5a and 5b, and it is possible to reduce media noise and increase the recording density.

To ensure the above-mentioned effects, it is preferred that the film thickness of first magnetic layer 5a containing Co is set to be within the range between 0.2 nm and 0.5 nm, and the film thickness of second magnetic layer 5b is within the range between 0.05 nm and 0.25 nm if it contains Pt, and the film thickness of the second magnetic layer 5b is within the range between 0.4 nm and 1.2 nm if it contains Pd. In the case where an oxide is added to any of first magnetic layers 5a and second magnetic layers 5b, it is preferred that the amount of oxide to be added to the respective layer is within the range between 5 mol % and 20 mol %. If the amount of oxide added is smaller than 5 mol %, the SNR cannot be satisfactorily improved since noise cannot be sufficiently reduced by the addition, and if the amount of oxide to be added is greater than 20 mol %, the SNR is lowered since the magnetic characteristics such as coercive force are deteriorated.

It should be noted that the order in which first magnetic layers 5a and second magnetic layers 5b are layered may be changed; Pt, Co, and Pt may be layered in this order.

Protective layer 6 may be formed of a protective film which has been conventionally used, and for example, a protective film composed mainly of carbon can be used. Also, lubricant layer 7 may be formed of a material which has been conventionally used, and for example, a perfluoro polyether liquid lubricant can be used. It should be noted that conditions used for a typical magnetic recording medium can be used as the conditions of protective layer 6 such as the film thickness and the conditions of lubricant layer 7 such as the film thickness.

Embodiments of the perpendicular magnetic recording medium according to the present invention will now be described. It should be noted that those embodiments are only representative examples useful in explaining the perpendicular magnetic recording medium according to the present invention and a method of manufacturing the same, and they are not limitative.

First Embodiment

FIG. 1 shows an example where the amount of oxygen which is added to underlayer 4 is changed in the case where first magnetic layers 5a are composed of Co, and second magnetic layers 5b are composed of Pt in the perpendicular magnetic recording medium according to a first embodiment. Perpendicular magnetic layer 5 shown in FIG. 1 will hereinafter be represented by "$(Co/Pt)_n$". The subscript n indicates that a combination of Co and Pt is layered n times.

A description will now be given of a process for fabricating the perpendicular magnetic recording medium according to the present embodiment.

Non-magnetic substrate 1 is a glass substrate with a diameter of 2.5 inches and a thickness of 0.64 mm. After the glass substrate is sufficiently cleaned, soft magnetic backing layer 2 is formed by sputtering soft magnetic CoZrNb. A target used here is composed of 87 atom % of Co, 5 atom % of Zr, and 8 atom % of Nb. Ar gas is used as sputtering gas, and CoZrNb is formed to have a thickness of 200 nm at a gas pressure of 1 Pa and at room temperature. It should be noted that CoZrNb has satisfactory soft magnetic characteristics even in an amorphous state in which it has been formed at a room temperature.

Ni—Fe alloy alignment control layer 3 is formed continuously on CoZrNb soft magnetic backing layer 2 by sputtering. A target used here is composed of 72 atom % of Ni, 18 atom % of Fe, and 10 atom % of Cr. Ar gas is used as sputtering gas, and NiFe alloy alignment control layer 3 is formed to have a thickness of 10 nm at a gas pressure of 1 Pa and at room temperature.

Ru underlayer 4 containing oxygen is formed continuously on Ni—Fe alloy alignment control layer 3. A target in which $RuO_2$ is mixed with Ru is used, and the ratio at which $RuO_2$ is mixed is changed to control the amount of oxygen which is added to Ru underlayer 4. Ru underlayer 4 is formed by sputtering to have a thickness of 10 nm. Ru underlayer 4 is formed at room temperature and at a gas pressure of about 1 Pa. For comparison, a perpendicular magnetic recording medium was manufactured without mixing $RuO_2$ with a target, and hence not adding oxygen to Ru underlayer 4.

Then, perpendicular magnetic layer 5 which is composed of a $(Co/Pt)_{20}$ multi-layered film is formed on underlayer 4 by sputtering. Targets used here are composed of pure Co and pure Pt, and the targets are discharged at the same time and rotated while being sputtered so that Co layers and Pt layers are alternately layered. Perpendicular magnetic layer 5 is sputtered using Ar gas, and is formed such that each Co layer has a film thickness of 0.44 nm and each Pt layer has a film thickness of 0.12 nm. It should be noted that perpendicular magnetic layer 5 is formed at room temperature and at a gas pressure of 5 Pa.

Next, carbon protective layer 6 is formed on the surface of perpendicular magnetic layer 5 by sputtering. Carbon is used as a target, and carbon protective layer 6 is formed to have a film thickness of 7 nm. It should be noted that carbon protective layer 6 is formed at room temperature and at an Ar gas pressure of about 1 Pa.

Figure 2:
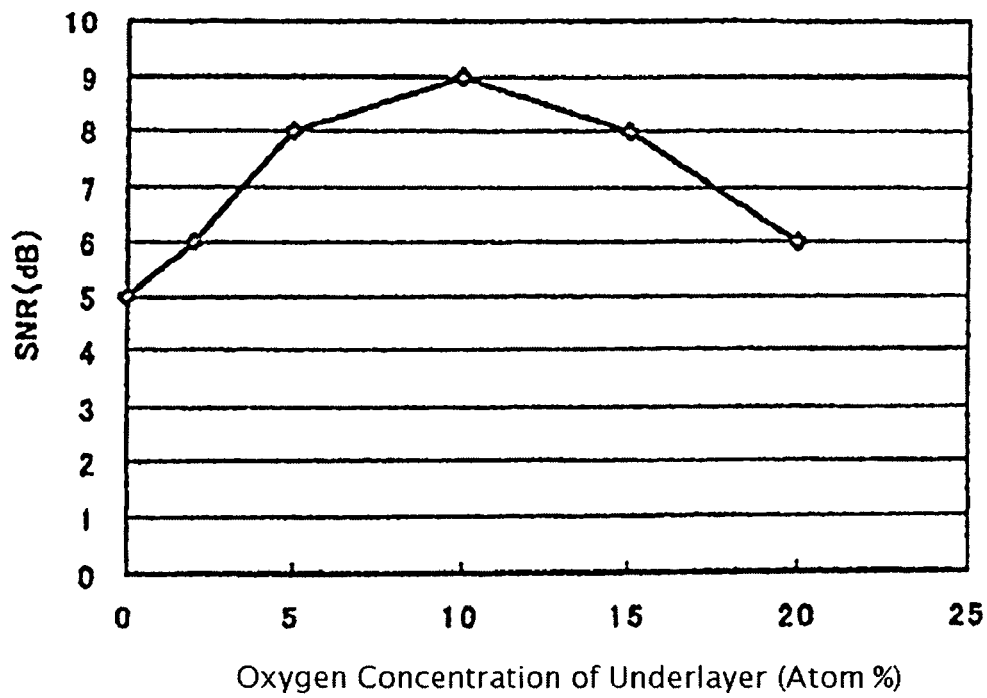
FIG. 2 is a view explaining changes in signal-to-noise ratio (SNR) in the case where a multi-layered film $(Co/Pt)_n$ is used as a perpendicular magnetic layer and the concentration of oxygen to be added to an underlayer is changed.

Finally, lubricant layer 7 is formed on the surface of carbon protective layer 6. Lubricant layer 7 is formed using a liquid lubricant composed of perfluoro polyether, and is formed to have a film thickness of 1.5 nm by a dip coating method. FIG. 2 is a view useful in explaining the effect achieved by adding oxygen to Ru underlayer 4, and shows the result obtained by evaluating the SNR using the perpendicular magnetic recording medium according to the present invention which is fabricated by the above described method. The SNR is evaluated using a spin stand tester and is measured at a linear recording density of 400 kFCI (kilo flux change per inch).

As shown in FIG. 2, as compared with the case where the Ru underlayer includes no oxygen, media noise is reduced and the SNR is increased due to the addition of oxygen. If oxygen is added to Ru underlayer 4, the separation of the crystal grains of the $(Co/Pt)_n$ multi-layered film formed on Ru underlayer 4 proceeds to reduce magnetic exchange interaction between the crystal grains and therefore improve the SNR. If an excessive amount of oxygen is added to Ru underlayer 4, the SNR is lowered since magnetic characteristics such as coercive force are deteriorated.

Second Embodiment

A description will now be given of a second embodiment of the present invention. According to the second embodiment, in the perpendicular magnetic recording medium in FIG. 1, the amount of oxygen which is added to underlayer 4 is changed in the case where first magnetic layers 5a are composed of Co—$SiO_2$, and second magnetic layers 5b are composed of Pt. Perpendicular magnetic layer 5 will hereinafter be represented by "(Co—SiO$_2$/Pt)$_n$". The subscript n indicates the same as mentioned above. Except for perpendicular magnetic layer 5, the perpendicular magnetic recording medium according to the present embodiment is fabricated in the same manner as in the above described first embodiment.

Perpendicular magnetic layer 5 which is composed of a (Co—SiO$_2$/Pt)$_{20}$ multi-layered film is formed on underlayer 4 by sputtering. A target composed of 7 mol % of SiO$_2$ mixed with Co is used for first magnetic layers 5a, and a target composed of pure Pt is used for second magnetic layers 5b. These targets are discharged at the same time and rotated while being sputtered, so that Co—SiO$_2$ layers and Pt layers are alternately layered. Perpendicular magnetic layer 5 is sputtered using Ar gas, and is formed such that the Co—SiO$_2$ layers have film thickness of 0.44 nm and the Pt layers have a film thickness of 0.12 nm.

Figure 3:
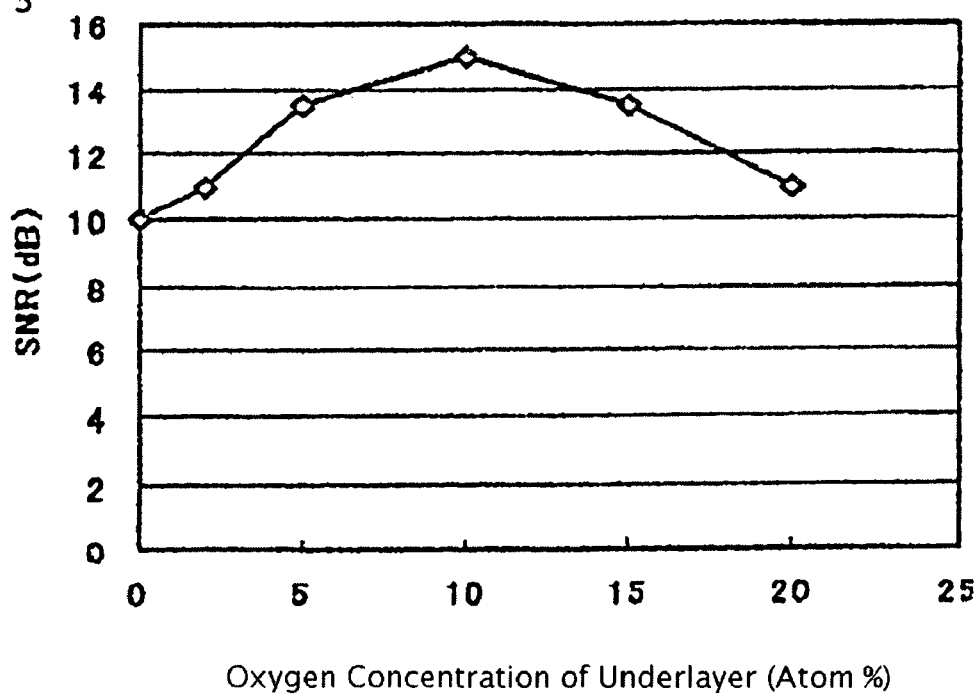
FIG. 3 is a view explaining changes in signal-to-noise ratio (SNR) in the case where a multi-layered film $(Co—SiO_2/Pt)_n$ is used as a perpendicular magnetic layer and the concentration of oxygen to be added to an underlayer is changed.

FIG. 3 is a view useful in explaining the effect achieved by adding oxygen to Ru underlayer 4, and shows the result obtained by evaluating the SNR using the perpendicular magnetic recording medium according to the present invention which is fabricated by the above described method. The SNR is evaluated in the same manner as in the above described first embodiment.

In the case where perpendicular magnetic layer 5 is composed of (Co—SiO$_2$/Pt)$_n$, media noise is reduced and the SNR is increased due to the addition of oxygen as compared with the case where no oxygen is included in Ru underlayer 4. In the case where perpendicular magnetic layer 5 is composed of (Co—SiO$_2$/Pt)$_n$, in addition to the effects produced by the introduction of oxygen into Ru underlayer 4, the SNR is further increased due to the enhanced separation of crystal grains attributed to the addition of SiO$_2$ to first magnetic layers 5a comprised of Co. If an excessive amount of oxygen is added to Ru underlayer 4, the SNR is lowered since magnetic characteristics such as coercive force are deteriorated as is the case with the first embodiment.

Third Embodiment

A description will now be given of a third embodiment of the present invention. According to the third embodiment, in the perpendicular magnetic recording medium in FIG. 1, first magnetic layers 5a are composed of Co—SiO$_2$, and second magnetic layers 5b are composed of Pt—SiO$_2$. Perpendicular magnetic layer 5 will hereinafter be represented by "(Co—SiO$_2$/Pt—SiO$_2$)$_n$". The subscript n indicates the same as mentioned above.

Except for the perpendicular magnetic layer 5, the perpendicular magnetic recording medium according to the third embodiment is fabricated in the same manner as in the above described first embodiment. It should be noted that the amount of oxygen which is added to Ru underlayer 4 is fixed at 10 atom %. For comparison, a perpendicular magnetic recording medium was manufactured trial without mixing RuO$_2$ with a target, and hence not adding oxygen to Ru underlayer 4.

Perpendicular magnetic layer 5 is composed of a (Co—SiO$_2$/Pt—SiO$_2$)$_{20}$ multi-layered film and is perpendicularly aligned on underlayer 4. It is formed by sputtering. A target composed of 7 mol % of SiO$_2$ mixed with Co is used for first magnetic layers 5a, and a target composed of 7 mol % of SiO$_2$ mixed with Pt is used for second magnetic layers 5b. These targets are discharged at the same time and rotated while being sputtered, so that Co—SiO$_2$ layers and Pt—SiO$_2$ layers are alternately layered. Perpendicular magnetic layer 5 is sputtered using Ar gas, and is formed such that the Co—SiO$_2$ layers have a film thickness of 0.44 nm and the Pt—SiO$_2$ layers have a film thickness of 0.12 nm. It should be noted that perpendicular magnetic layer 5 is formed at room temperature and at a gas pressure of 5 Pa.

The SNR was evaluated using the perpendicular magnetic recording medium fabricated in the above described manner. The SNR was measured in the same manner as in the first embodiment. In the case where 10 atom % of oxygen was added to the Ru underlayer, the SNR is 16 dB, and in the case where no oxygen was added to the Ru underlayer, the SNR was 11 dB.

Also, in the case where the perpendicular magnetic layer is composed of (Co—SiO$_2$/Pt—SiO$_2$), media noise is reduced and the SNR is increased due to the addition of oxygen as compared with the case where no oxygen is included in the Ru underlayer. In the case where the perpendicular magnetic layer is composed of (Co—SiO$_2$/Pt—SiO$_2$)$_n$, the SNR is further increased due to the enhanced separation of the crystal grains attributed to the addition of SiO$_2$ to the second magnetic layers composed of Pt as well as the addition of oxygen to the Ru underlayer and the addition of SiO$_2$ to the first magnetic layers.

It should be noted that in the case where an oxide such as Al, Ga, In, Ge, Sn, Sb, Bi, Zn, Cd, Cr, Mo, W, V, Nb, Ta, Ti, Zr, Hf, Y, Mg, or Ba other than SiO$_2$ is added to the first magnetic layers and the second magnetic layers, the same effects can be obtained.

Since the perpendicular magnetic recording medium is constructed in the above described manner, it is possible to facilitate the separation of crystal grains of the perpendicular magnetic layer formed of the multi-layered film and reduce the magnetic exchange interaction of the crystal grains. As a result, media noise can be reduced, and the signal-to-noise ratio (SNR) during reading and writing can be increased. This increases the surface recording density.

Thus, a perpendicular magnetic recording medium and method for manufacturing the same has been described according to the present invention. Many modifications and variations may be made to the techniques and structures described and illustrated herein without departing from the spirit and scope of the invention. Accordingly, it should be understood that the methods and media described herein are illustrative only and are not limiting upon the scope of the invention.

What is claimed is:

1. A perpendicular magnetic recording medium comprising:
    a non-magnetic substrate;
    an underlayer that consists of Ru and oxygen; and
    a perpendicular magnetic layer on the underlayer, the perpendicular magnetic layer comprising at least first magnetic layers and second magnetic layers that are alternately layered,
    wherein the first magnetic layer is Co or Co containing an oxide and the second magnetic layer is Pt, Pd, Pt that contains an oxide, or Pd that contains an oxide, and
    wherein the amount of oxygen contained in the underlayer is between 2 atom % and 20 atom %.

2. A perpendicular magnetic recording medium according to claim 1, wherein the oxide contained in the first magnetic layer is an oxide of at least one element among Si, Al, Ga, In, Ge, Sn, Sb, Bi, Zn, Cd, Cr, Mo, W, V, Nb, Ta, Ti, Zr, Hf, Y, Mg, and Ba, and the content of oxide is between 5 mol % and 20 mol %.

3. A perpendicular magnetic recording medium according to claim 1, wherein the oxide contained in the second magnetic layer is an oxide of at least one element among Si, Al, Ga, In, Ge, Sn, Sb, Bi, Zn, Cd, Cr, Mo, W, V, Nb, Ta, Ti, Zr, Hf, Y, Mg, and Ba, and the content of oxide is between 5 mol % and 20 mol %.

4. A perpendicular magnetic recording medium according to claim 2, wherein the oxide contained in the second magnetic layer is an oxide of at least one element among Si, Al, Ga, In, Ge, Sn, Sb, Bi, Zn, Cd, Cr, Mo, W, V, Nb, Ta, Ti, Zr, Hf, Y, Mg, and Ba, and the content of oxide is between 5 mol % and 20 mol %.

5. A perpendicular magnetic recording medium according to claim 1, further comprising a soft magnetic backing layer and an alignment control layer formed of an Ni—Fe alloy, the soft magnetic backing layer and the alignment control layer being sequentially formed in this order between the non-magnetic substrate and the underlayer.

6. A perpendicular magnetic recording medium according to claim 2, further comprising a soft magnetic backing layer and an alignment control layer formed of an Ni—Fe alloy, the soft magnetic backing layer and the alignment control layer being sequentially formed in this order between the non-magnetic substrate and the underlayer.

7. A perpendicular magnetic recording medium according to claim 3, further comprising a soft magnetic backing layer and an alignment control layer formed of an Ni—Fe alloy, the soft magnetic backing layer and the alignment control layer being sequentially formed in this order between the non-magnetic substrate and the underlayer.

8. A perpendicular magnetic recording medium according to claim 4, further comprising a soft magnetic backing layer and an alignment control layer formed of an Ni—Fe alloy, the soft magnetic backing layer and the alignment control layer being sequentially formed in this order between the non-magnetic substrate and the underlayer.

* * * * *